June 3, 1924.
W. L. RUMGAY
1,496,134
TOOL FOR EXTRACTING EXPANSION BOLTS
Filed March 9, 1923
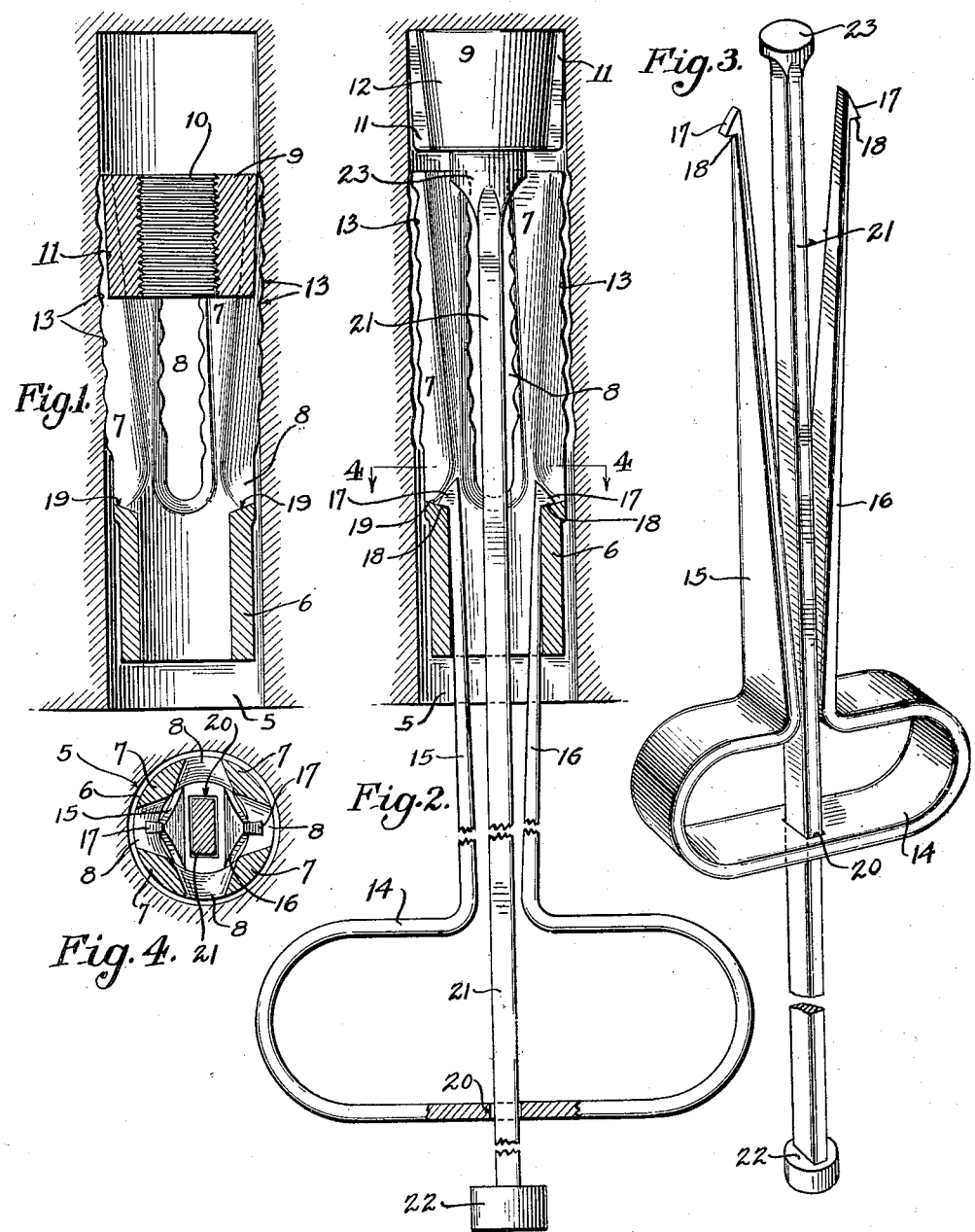
WITNESSES
Louis Goodman
E. N. Lovewell
INVENTOR
W. L. Rumgay
BY
ATTORNEY Patented June 3, 1924.

1,496,134

UNITED STATES PATENT OFFICE.

WILLIAM LEADBETTER RUMGAY, OF WILDER, VIRGINIA.

TOOL FOR EXTRACTING EXPANSION BOLTS.

Application filed March 9, 1923. Serial No. 623,975.

*To all whom it may concern:*

Be it known that I, WILLIAM L. RUMGAY, a citizen of the United States, residing at Wilder, in the county of Russell and State of Virginia, have invented new and useful Improvements in Tools for Extracting Expansion Bolts, of which the following is a specification.

My invention relates to a tool for extracting hollow expansion bolts, and is especially designed for extracting bolts of the type which are customarily used in mines for supporting the studs from which the electrical equipment is suspended.

In providing electrical equipment for coal mines and the like, it is the usual practice to provide holes in the roof of the mine in each of which is inserted a hollow expansion bolt consisting of a shell, the upper portion of which is divided into a plurality of expansible sections within which is received a tapered nut that cooperates with a stud for supporting the electrical fixtures. The nut is provided with fins which engage in the slots between the expansible sections to prevent the turning of the nut while the stud is being screwed in or removed therefrom. When the stud is screwed in the nut is drawn into the shell, expanding the same so as to firmly engage with the sides of the hole. When the mine is exhausted and abandoned, the studs and other fixtures are removed and used elsewhere. It has hitherto been the practice to leave the bolts and nuts in the holes, since no practical means has been devised for their recovery.

It is the object of the present invention to provide a simple and practical tool with which these bolts may be easily and quickly extracted to be used in other parts of the mine and thus eliminate the expense of providing a large number of new bolts.

The tool which constitutes my invention will be more particularly described in connection with the accompanying drawing which illustrates the preferred form of the invention.

In the drawing:—

Fig. 1 is a vertical sectional view through the bolt and nut in position in the hole after the stud has been removed.

Fig. 2 is a similar section showing the tool inserted and the bolt being extracted.

Fig. 3 is a perspective view of the tool.

Fig. 4 is a cross section taken on the line 4—4 of Fig. 2.

Referring more specifically to the drawing, 5 indicates a hole bored in the roof of the mine, in which the expansion bolt 6 is inserted. The bolt consists of a hollow substantially cylindrical shell, the upper portion of which is divided longitudinally into a plurality of sections 7 separated by slots 8. In securing the bolt in the hole 5, the tapered nut 9 is inserted in the hole in advance of the bolt and is retained by friction in the upper end thereof. The stud is then inserted and the upper threaded end thereof screwed into the threaded opening 10 in the nut, which is held against rotation relatively to the bolt by the fins 11 which extend into the slots 8. As the stud is screwed in, the nut is drawn downwardly and the tapered wall 12 engages with the sections 7, expanding the same and causing the roughened outer surface 13 to engage firmly with the wall of the bore, whereby the bolt is firmly secured and supports the stud and the fixtures which may be attached thereto.

In order to remove the bolt, therefore, it is first necessary to drive out the nut into the upper portion of the hole above the bolt so as to release the sections 7 and permit the same to be drawn inwardly and to be disengaged from the sides of the bore.

The tool which I have invented for this purpose, consists of a handle 14, preferably of spring metal, and having upwardly-extending legs 15 and 16, the spring tension being such that the legs are normally in divergent relation but may be drawn together so as to be inserted through the shell 6. Each leg is tapered upwardly and terminates in an outwardly-extending lug 17 having a shoulder 18 which is engageable with a shoulder 19 formed at the base of each of the slots 8, as illustrated in Fig. 2.

The handle 14 is provided centrally with a substantially rectangular slot 20 in which is reciprocably mounted a comparatively long rod 21 having at its ends the enlarged heads 22 and 23.

In the operation of my improved tool, the legs 15 and 16 are introduced through the opening in the shell 6 until the lugs 17 engage with the shoulders 19, the tension of the legs being sufficient to hold the same outwardly against the sides of the shell, as illustrated in Fig. 2. Thus, downward pressure may be exerted against the bolt while a blow on the head 22 by a hammer or mallet will drive the nut 12 upwardly and release the sections 7 from their engagement with the sides of the bore. A slight pull downwardly on the handle 14 will then easily remove the bolt from the bore and the nut 12 will drop out.

From the foregoing description, it will be seen that I have devised a tool whereby the expansion bolts may be economically reclaimed and thus a great saving may be effected. Although I have described the invention particularly with reference to the removal of expansion bolts such as are customarily used in the installation of electrical equipment in mines, it will be readily understood that the tool may be used in other relations wherever it is desired to extract bolts or other elements of a similar nature. Modifications may also be made in the details of construction of the tool without departing from the scope of the invention which is limited only by the scope of the claims.

What is claimed is:—

1. A tool comprising a handle of spring metal, a pair of legs extending forwardly from the handle and normally urged into divergent relation, and a rod mounted to reciprocate between the legs.

2. A tool comprising a handle of spring metal, a pair of legs integral with the handle and extending forwardly therefrom and normally tensioned so as to diverge from the handle outwardly, and a rod mounted to reciprocate between the legs.

3. A tool comprising a handle, a pair of legs extending forwardly from the handle and normally urged into divergent relation, said legs terminating in outwardly-turned lugs having flat shoulders facing toward the handle, and a rod mounted to reciprocate between the legs.

4. A tool comprising a handle, a pair of legs extending forwardly therefrom and relatively movable laterally into divergent relation, and a rod mounted to reciprocate between the legs and having an enlarged head at each end.

5. A tool comprising a handle of spring metal, a pair of legs integral with the handle and extending forwardly therefrom and normally urged into divergent relation, said handle having a centrally formed slot, and a rod slidably mounted within the slot and extending between the legs and having an enlarged head at each end.

6. A tool comprising a handle of spring metal having a pair of legs integral therewith and extending upwardly therefrom and normally divergent, said legs terminating in outwardly-turned lugs, and a rod reciprocably mounted in the handle and extending between the legs and having an enlarged head at each end.

7. A tool for extracting bolts which have expansible sections secured by a tapered nut, comprising a handle, a plurality of integrally connected spring legs insertible through the bolt and normally urged outwardly and terminating in lugs engageable with the slots in the bolt, and a rod mounted to reciprocate between the legs and having an enlarged head at each end, one head to engage the tapered nut and drive the same from the bolt and the other adapted to receive blows from a hammer.

8. A tool of the character described, comprising a handle, a pair of legs extending from the handle and normally urged into divergent relation, means on the legs for engaging one part of the article to be pulled, and a slidable rod working between the legs and having a head on its inner end to engage the other part.

9. In a tool for extracting expansion bolts, a handle, means carried by the handle to engage the sleeve or shell, and means slidable within said means for driving the nut inwardly and holding it while the sleeve or shell is being removed.

In testimony, that I claim the foregoing as my own, I have hereto affixed my signature.

WILLIAM LEADBETTER RUMGAY.